United States Patent [19]

Kliman et al.

[11] Patent Number: 4,578,610

[45] Date of Patent: Mar. 25, 1986

[54] SYNCHRONOUS DISK MOTOR WITH AMORPHOUS METAL STATOR AND PERMANENT MAGNET ROTOR AND FLYWHEEL

[75] Inventors: Gerald B. Kliman, Schenectady; Allan B. Plunkett, Scotia, both of N.Y.

[73] Assignee: General Electric Company, Schenectady, N.Y.

[21] Appl. No.: 624,328

[22] Filed: Jun. 25, 1984

Related U.S. Application Data

[63] Continuation of Ser. No. 914,191, Jun. 12, 1978, abandoned.

[51] Int. Cl.$^4$ ............................................. H02K 21/12
[52] U.S. Cl. .................................... 310/156; 310/162; 310/268
[58] Field of Search ................................ 310/162–164, 310/260, 42, 43, 44, 45, 156; 336/213

[56] References Cited

U.S. PATENT DOCUMENTS

| | | | |
|---|---|---|---|
| 3,061,750 | 10/1962 | Stegman | 310/268 |
| 3,223,867 | 12/1965 | Shapiro | 310/268 X |
| 3,230,406 | 1/1966 | Henry-Baudot | 310/268 X |
| 3,581,389 | 6/1971 | Mori et al. | 310/268 X |
| 4,116,728 | 9/1978 | Becker et al. | 336/213 X |

Primary Examiner—Donovan F. Duggan
Attorney, Agent, or Firm—Marvin Snyder; James C. Davis, Jr.

[57] ABSTRACT

An electric machine has a stator body formed of a coil of concentric layers of amorphous metal tape and slots are formed in one end of the coil for receiving a stator winding. A rotor structure having permanent magnet poles embedded therein is placed adjacent the end surface of the stator and is coupled thereto through the axial gap between the stator and rotor. The magnets are held in place in a nonmagnetic matrix which consists of an epoxy fiber laminate material. By enlarging the outer diameter of the rotor with the epoxy fiber laminate material, the rotor serves as an integral flywheel structure.

9 Claims, 11 Drawing Figures

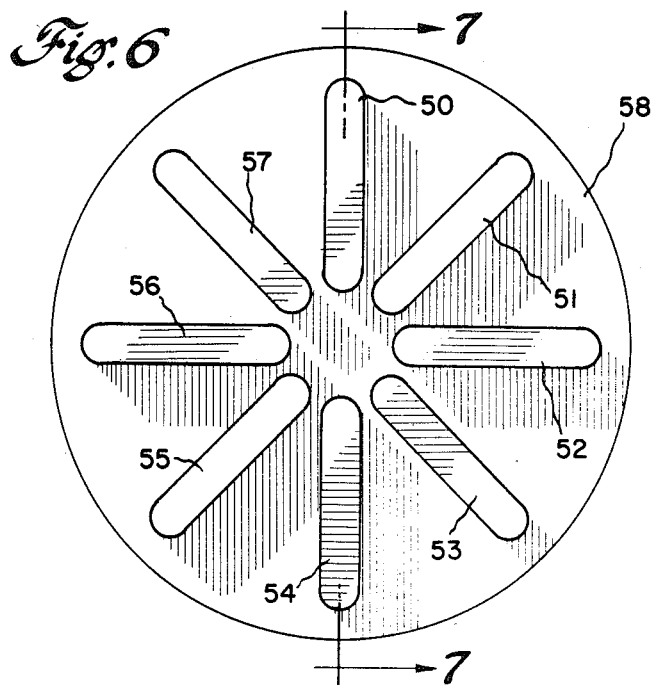
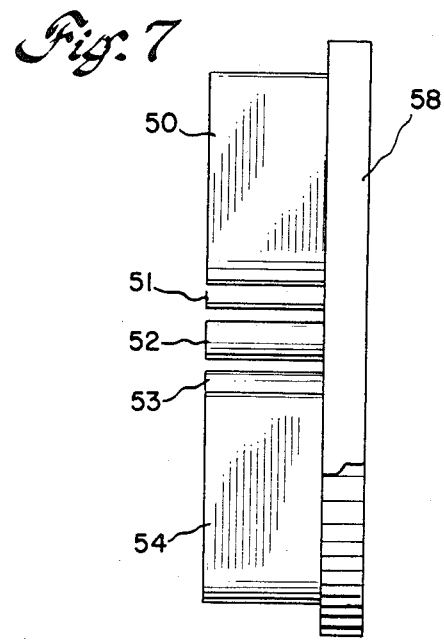
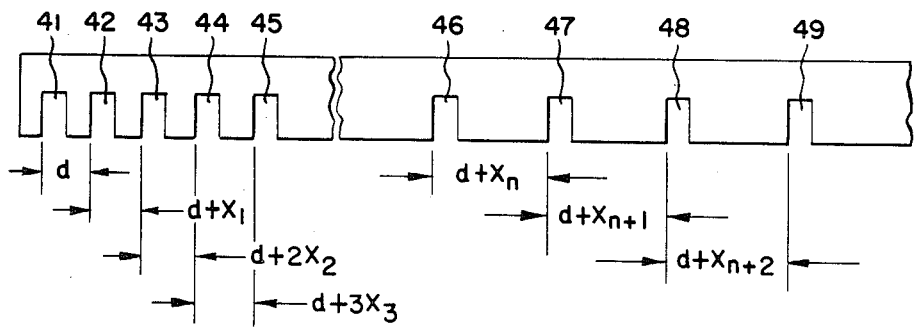
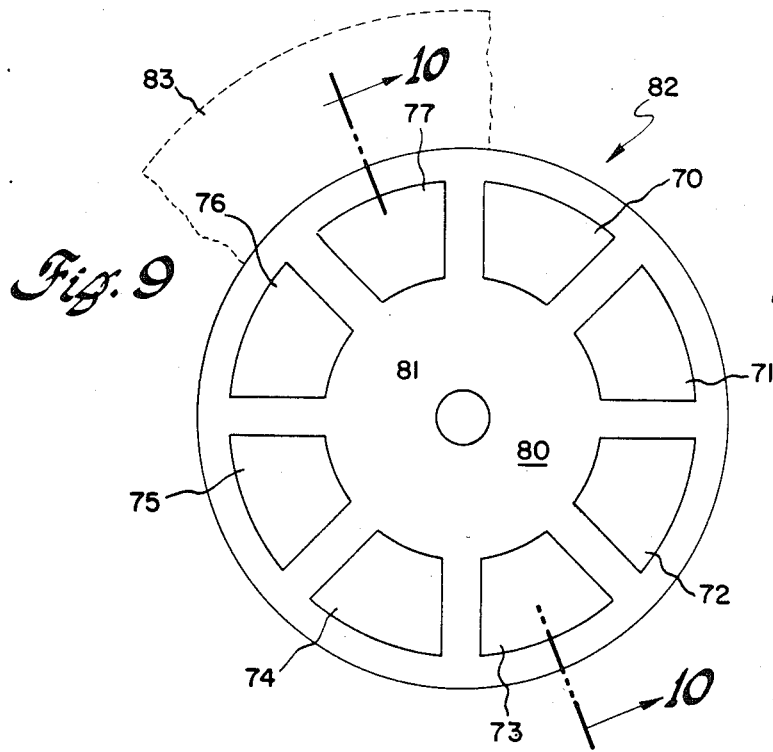
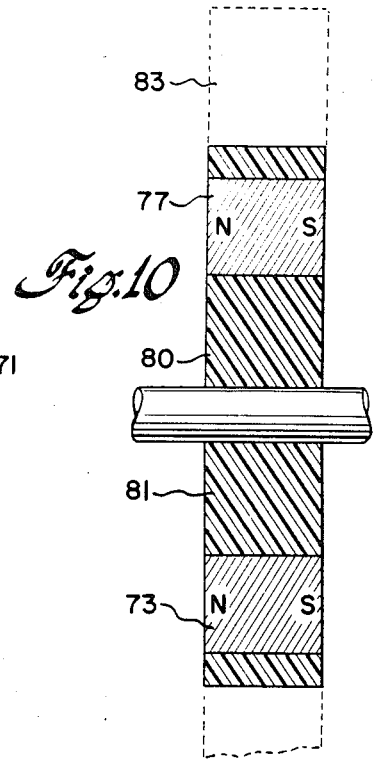

4,578,610

SYNCHRONOUS DISK MOTOR WITH AMORPHOUS METAL STATOR AND PERMANENT MAGNET ROTOR AND FLYWHEEL

This application is a continuation of application Ser. No. 914,191 filed June 12, 1978 now abandoned.

RELATED APPLICATIONS

This application is related to: application Ser. No. 914,190 filed concurrently herewith, in the name of Thomas Anthony Lipo, entitled "Salient Pole Configuration For Use as A Reluctance Motor Employing Amorphous Metal", now abandoned;

Application Ser. No. 914,194 filed concurrently herewith, in the names of Vernon Bertram Honsinger and Russell Edward Tompkins, entitled "Slotless Motor Design Using Amorphous Metal", abandoned in favor of continuation application Ser. No. 208,427, filed Nov. 1980;

Application Ser. No. 914,446 filed concurrently herewith, in the names of Vernon Bertram Honsinger and Russell Edward Tompkins, entitled "Stator Design for Induction and Hysteresis Motors Using Amorphous Metal Tape", now abandoned;

Application Ser. No. 914,445 filed concurrently herewith, in the names of Vernon Bertram Honsinger and Russell Edward Tompkins, entitled "Amorphous Metal Hysteresis Motor", now U.S. Pat. No. 4,286,188 issued Aug. 25, 1981; and Application Ser. No. 914,443 filed concurrently herewith, in the name of Gerald Burt Kliman, entitled "Induction Disk Motor With Amorphous Metal Tape", now abandoned in favor of continuation-in-part application Ser. No. 196,456, filed Oct. 14, 1980 now U.S. Pat. No. 4,363,988 issued Dec. 14,1982 all of which are assigned to the instant assignee.

BACKGROUND OF THE INVENTION

This invention relates to electric machines, and more specifically to a synchronous disk type motor using an amorphous metal stator structure and a permanent magnet rotor which can also serve as an integral flywheel for the motor.

High efficiency motors which are driven by load commutated inverters are required particularly for applications such as direct wheel drives for electric vehicles, single motor drives for electric vehicles, and generally for motor/generator structures for cars and buses with an integrated flywheel.

Low cost magnetic materials and low loss high efficiency materials would be very desirable for use in such applications, and a disk type motor configuration would also be very desirable for these applications.

Amorphous metal tape having good magnetic properties has recently become available at about one-fourth the cost of conventional steels used in electric machines. These tapes exhibit a core loss about one-fourth that of the conventional silicon iron and have very high permeability. Amorphous metal tapes, however, are not available in the usual lamination form now needed for the construction of conventional electric machines so that the desirable magnetic properties and low cost of the amorphous metal glass has not been used for an electric machine. Presently available tape is made very thin (of from 0.0005 to 0.003 inch thick) and in widths of up to about two inches this time.

Amorphous metal tapes having magnetic properties desired for application to electric machines are disclosed in U.S. Pat. Nos. 3,856,513, dated Dec. 24, 1974, in the name of Chen et al.; 3,881,542, dated May 6, 1975, in the name of Polk et al.; 4,052,201, dated Oct. 4, 1977, in the name of Polk et al.; 4,059,441, dated Nov. 22, 1977, in the name of Ray. A survey of metal glass technology is given in the article "Metallic Glasses" by John J. Gilman appearing in Physics Today, May 1975, pages 46 to 53. Some attempts are being made to exploit the advantages of the properties of these metal tapes, for example, for acoustic devices as shown in U.S. Pat. No. 3,838,365.

An object of the present invention is to employ, for a disk type motor, an amorphous metal tape to form a stator structure which cooperates with a novel permanent magnet rotor which may have an integral flywheel configuration for energy storage purposes.

BRIEF DESCRIPTION OF THE PRESENT INVENTION

In accordance with the present invention, a motor assembly is provided wherein the motor stator is constructed of a coiled strip of amorphous metal tape which is built in the manner set forth in copending application Ser. No. 914,443, filed concurrently herewith, in the name of Gerald Burt Kliman, entitled "Induction Disk Motor With Amorphous Metal Tape". This type of stator structure permits use of a disk type configuration for an electric machine. In accordance with the invention, a permanent magnet type rotor is used with the stator structure disclosed in the aforementioned application where the permanent magnets are distributed around an annulus which confronts the pole faces formed in one side of the stator structure. The permanent magnet structures may be GECOR (a trademark of the General Electric Company) permanent magnets magnetized in a direction parallel to the axis of rotation of the rotor and alternate in polarity direction.

The individual magnets are embedded in a suitable plastic encapsulating material such as an epoxy fiber reinforced material which can have any desired diameter in order to serve as an integral flywheel with the rotor structure and function.

With the arrangement of the electric machine of the invention, the flux coupling the rotor and stator bodies passes directly across a short axial air gap and through the magnets closing azimuthally through the stator yokes. The radial positions of the magnets and stator are not critical, allowing the magnets to be located in a relatively low stress region so as not to impair integrity of the flywheel structure. In this way, a large saving in space and reduction in complexity, cost and reliability are achieved.

BRIEF DESCRIPTION OF THE DRAWINGS

FIG. 6 shows a winding jig which can be used to assist in the winding of a prepunched tape to the form of the coil shown in FIG. 3.

FIG. 7 is a cross-sectional view of FIG. 6 taken across the section line 7—7 in FIG. 6.

FIG. 8 is top view of a section of the elongated amorphous metal tape which is used to form the stator body of FIGS. 1 to 5 and shows prepunched identical notches in the tape which have an increasing separation from one another and which can be wound on the tool of FIGS. 6 and 7.

FIG. 9 is an elevation view of a rotor structure constructed in accordance with the invention.

FIG. 10 is a cross-sectional view of FIG. 9 taken across the section line 10—10 in FIG. 9 with the possibility for an enlarged rotor diameter indicated in dotted lines.

DETAILED DESCRIPTION OF THE DRAWINGS

Figure 1:
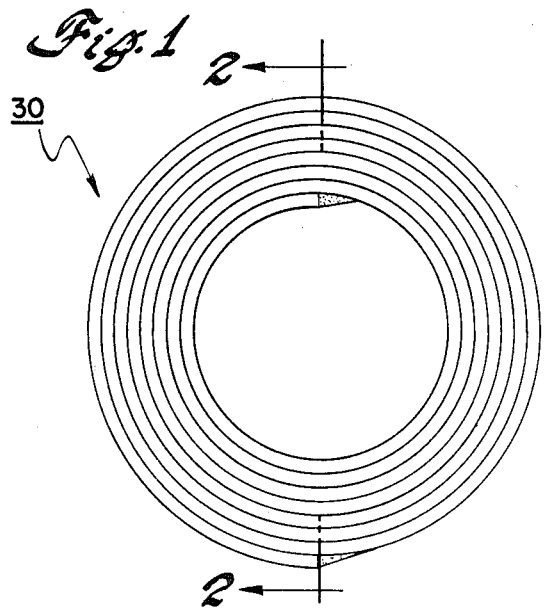
FIG. 1 is a side elevation view of a coil of amorphous metal tape which will be used for the stator body of the motor.
Figure 2:
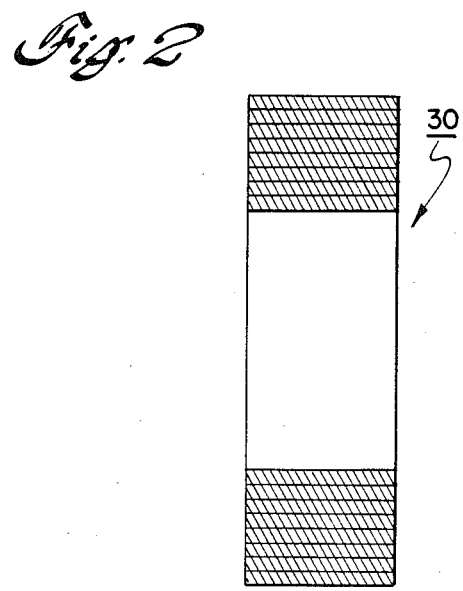
FIG. 2 is a cross-sectional view of FIG. 1 taken across the section line 2—2 in FIG. 1.

Referring first to FIGS. 1 and 2, there is illustrated therein an annular coil 30 of an amorphous metal tape in the form of a convolution, the tape having a thickness, for example, of 0.002 inch and width, for example of 1 inch. The winding can have several thousand layers to define a radial thickness of several inches, for example. The tape forming coil 30 may have a composition of $Fe_{80}B_{20}$ (Allied Metglas ® #2605) for example.

Figure 3:
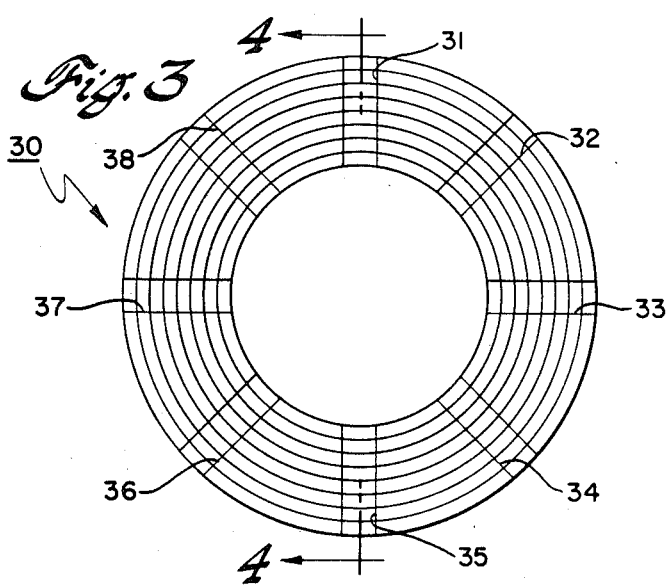
FIG. 3 is an elevation view of the stator body of FIGS. 1 and 2 after slots have been formed in one end of the stator body.
Figure 4:
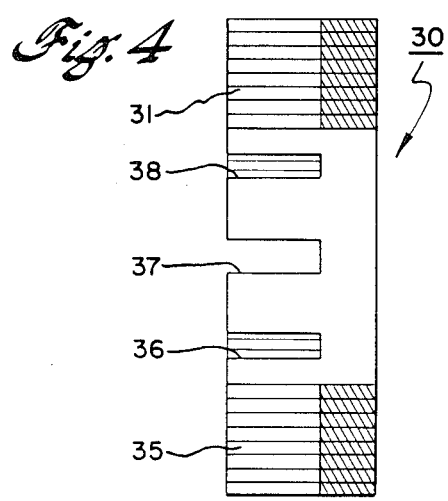
FIG. 4 is a cross-sectional view of FIG. 3 taken across the section line 4—4 in FIG. 3.

The inner and outer ends of the tape can be secured to their adjacent outer and inner layer, respectively, as by cementing or the like. After the coil 30 is wound, it is slotted by any desired slotting mechanism with any desired number of equally spaced slots depending on the number of poles for the machine. In the example given herein, eight slots 31 to 38 are used, as shown in FIGS. 3 and 4. These slots may have a depth of about 0.5 inch and a width of about 0.25 inch.

While the slots can be machined after the cylinder 30 is wound, it is also possible to form notches in the tape prior to the winding of the tape as will be described more fully hereinafter.

Figure 5:
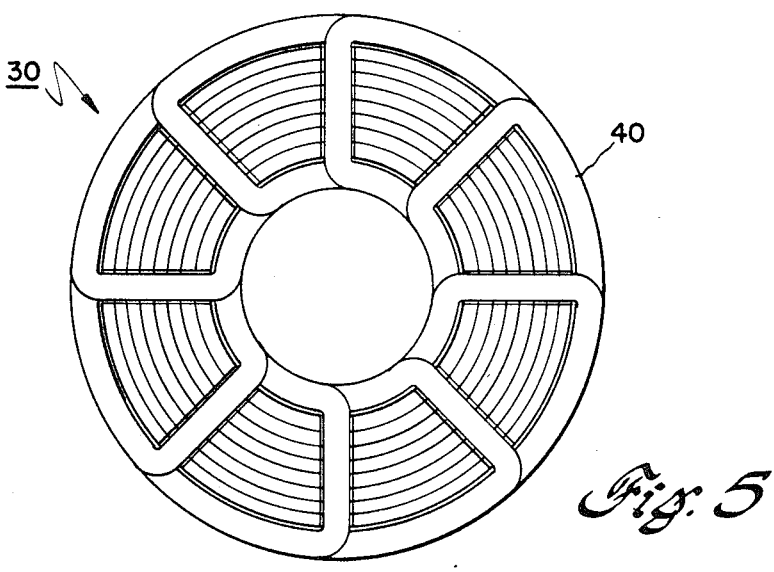
FIG. 5 is an elevation view of the stator body of FIG. 3 after a radially arranged winding is placed in the slots of the stator body to define the stator winding of the machine to be formed.

A suitable stator winding 40, shown in FIG. 5, is then placed on the slots 31 to 38, where the winding 40 may be of the type which produces an azimuthal travelling wave of magnetomotive force as in a conventional single or multiphase motor, except that the windings are radial instead of axial.

The stator construction can then be used in any desired motor configuration by itself or can be used in combination with the particular disk type motor which will be later described.

One method for forming the slotted body shown in FIG. 3 without need for machining a wound cylinder as in FIG. 1, is to prenotch the tape as shown in FIG. 8 for the case of notches 41 to 49. Notches 41 to 49 have identical shapes but their spacing increases along the length of the tape so that, as the tape is wound, the notches of each layer will register with those in adjacent layers to ultimately define equally spaced identical slots along the radial thickness of the cylinder. By prepunching the tape as shown in FIG. 8, the final rotor body will have a lower loss than if the stator body had been machined to form the slots due to the absence of smearing (i.e., the layers can be completely insulated, electrically, from each other).

A suitable feeder control notching machine can be used to form the notches in the tape, as shown in FIG. 8, and will be controlled by calculating the exact distance which should be used between adjacent notches so that the notches will register with one another in the completed coil.

The prenotched tape of FIG. 8 can be wound in a winding jig of the type shown in FIGS. 6 and 7, having ribs 50 to 57 extending from a rear support surface 58. Ribs 50 to 57 correspond in angle to the angles between the slots 31 to 38 (FIG. 3) of the completed stator body. Thus, the tape of FIG. 8 can be wound simply by laying the notched tape onto corresponding ribs 50 to 57 as the tape coil is wound.

FIGS. 9 and 10 illustrate the construction of the rotor which can be assembled with the stator in accordance with the present invention. The rotor includes a plurality of permanent magnets 70–71 forming an eight-pole arrangement to cooperate with the eight poles of the stator. As shown in FIGS. 9 and 10, the permanent magnets are each fixed in place relative to one another and are embedded in an appropriate nonmagnetic matrix which may comprise epoxy fiber laminate (i.e., synthetic fibers imbedded in an epoxy binder) type disk 80 which is, in turn, fixed to a central axial shaft 81. Alternatively, disk 80 may be comprised of stainless steel or a high strength nonmagnetic metallic conductor. Each of the permanent magnets 70 to 77 is magnetized in a direction opposite to the direction of magnetization of its neighboring permanent magnet, and each is magnetized in the direction of the axis of shaft 81. Although the magnets are shown extending completely through the rotor, they may, alternatively, extend for less than the full thickness of the rotor.

Figure 11:
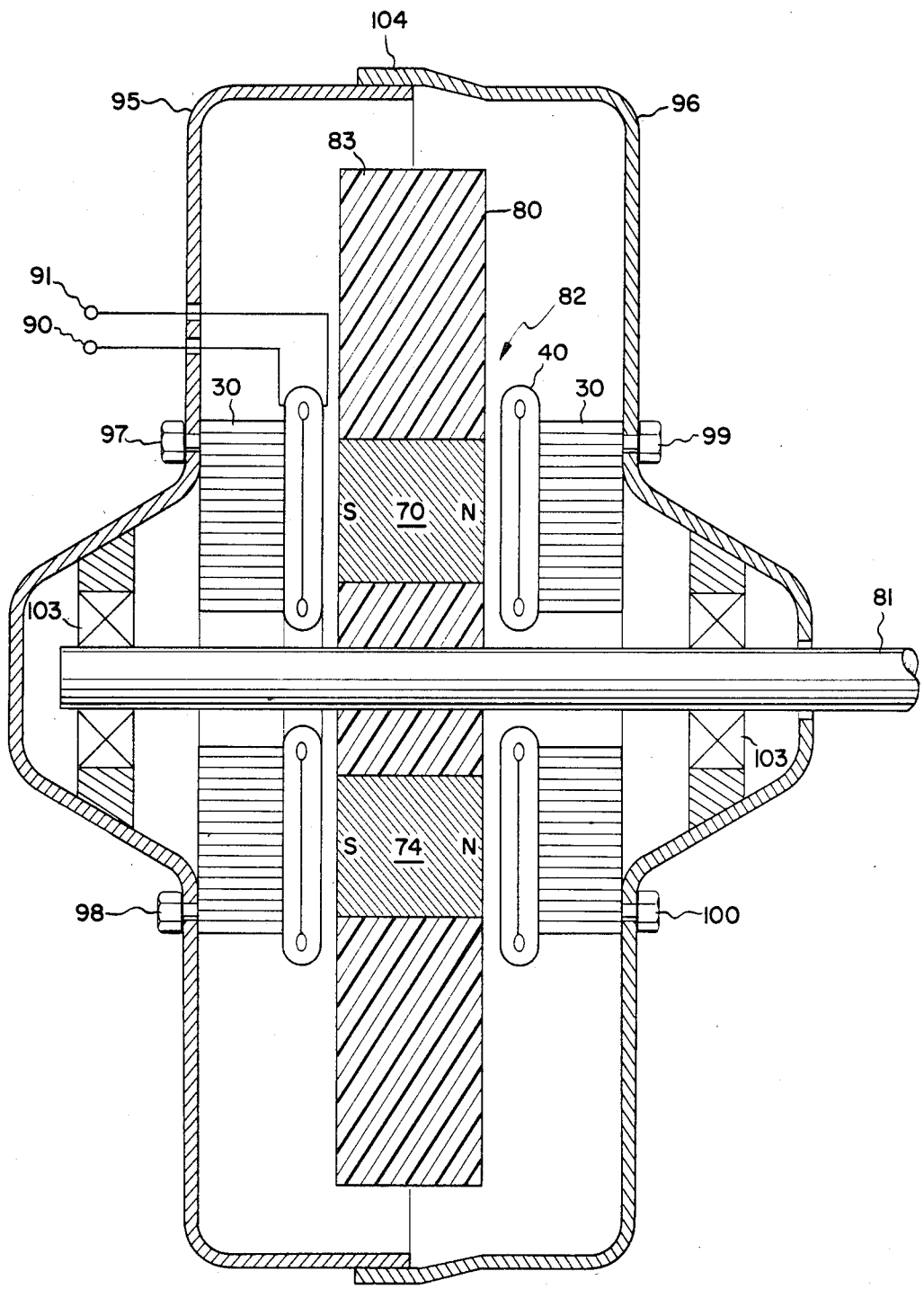
FIG. 11 is a cross-sectional view of a motor assembly constructed in accordance with the present invention.

The entire rotor assembly 82 may have an outer diameter, such as that shown by solid line, to correspond generally to the outer diameter of the stator of FIG. 5. Alternatively, the epoxy fiber laminate material 80 can have the enlarged diameter shown by dotted line 83 in FIGS. 9 and 10 and as shown in the embodiment of FIG. 11. The enlarged diameter rotor structure allows the permanent magnets 70 to 77 to be located in a relatively low stress region while also defining an effective flywheel that can serve to store energy during the operation of the machine, such as in electric vehicles (e.g., cars and busses).

FIG. 11 shows a motor assembly which can be made in accordance with the present invention using two stators 30 which are identical to the stators shown in FIGS. 1 through 5. Stators 30 in FIG. 11 are schematically illustrated as having stator windings 40 which are connected to electrical terminals 90 and 91, and both stators are bolted to housing halves 95 and 96, respectively, as by bolts 97-98 and 99-100, respectively. To complete the motor assembly, housing halves 95 and 96 are joined together by the mechanical connection 104 or in any other desired manner.

Each of the housing halves 95 and 96 supports bearings 102 and 103 which, in turn, support the shaft 81 of the rotor structure 82. The pole faces of the permanent magnets 70 through 77 then line up appropriately with corresponding pole faces, respectively, formed in the stator bodies 30 on opposite sides of the disk type rotor in FIG. 11.

The disk type rotor, shown in FIG. 11 with an enlarged outer diameter formed by the epoxy fiber laminate or any other material, comprises a rotor having a relatively high moment of inertia so as also to serve as an effective flywheel.

In one embodiment of the invention, the rotor 82 has an outer diameter of 30 inches and the permanent magnets 70 to 77 may be formed on an annulus having an inner diameter of 4 inches and an outer diameter of 6 inches. The rotor thickness may be about 1 inch and the air gap between the rotor sides and corresponding stator poles may be about 0.1 inch.

Although only certain preferred features of this invention have been described, many variations and modifications will now be apparent to those skilled in the art, and it is therefore to be understood that the appended claims are intended to cover all such variations and modifications as fall within the true spirit of the invention.

What is claimed is:

1. An electrical machine comprising, in combination:

a first ferromagnetic stator body;

a rotor body disposed adjacent said stator body and being rotatable with respect thereto, said rotor body and stator body being separated from one another by an air gap and being magnetically coupled to one another through said air gap;

said stator body comprising a coil of concentric turns of a thin elongated amorphous metal tape wound in the form of an annulus with a central opening;

said stator body annulus having first and second end surfaces, and a plurality of symmetrically distributed slots extending axially across at least a portion of the radial thickness of said first end surface and in a direction perpendicular to the layers of said tape and extending into said annulus for a predetermined depth; and stator winding means wound in said slots;

said rotor body including a plurality of permanent magnets symmetrically located and circumferentially spaced relative to one another, around the axis of rotation of said rotor body; each of said permanent magnets being magnetized in a direction parallel to said axis of rotation and generally confronting a separate pole, respectively, defined at least in part by said stator winding means wound in said slots.

2. The machine of claim 1 wherein each of said permanent magnets is magnetized in a direction opposite to that of each adjacent permanent magnet.

3. The machine of claim 1 wherein said rotor body further includes a plastic binder material defining the shape of said rotor body and fixing said permanent magnets in position.

4. The machine of claim 1 wherein said slots comprise preformed notches of equal size in said tape, extending perpendicularly into one edge thereof for said predetermined depth; said notches being spaced apart from each other along the length of said tape by a progressively increasing distance so as to cause registry of notches in successively increasing diameter layers of said tape.

5. The machine of claim 1 wherein said tape is of less than about 10 mils in thickness.

6. The machine of claim 1 which includes a second stator body substantially identical in construction to said first stator body; said first and second stator bodies each being coaxial with respect to one another and being spaced apart from one another such that their slots face one another; said rotor body being positioned between said first and second stator bodies.

7. The machine of claim 3 wherein said plastic binder material comprises an epoxy fiber-filled material.

8. The machine of claim 6 wherein the outer diameter of said rotor body is substantially greater than the outer diameter of either of said first and second stator bodies.

9. The machine of claim 3 wherein each of said permanent magnets is generally arcuately shaped and said permanent magnets collectively define an annulus in general alignment with the poles of said stator body.

* * * * *